United States Patent
Arthur

[15] 3,636,870
[45] Jan. 25, 1972

[54] DEVICE FOR EXTRACTING FRUIT JUICES

[72] Inventor: Samuel M. Arthur, 18549 Poplar Ave., Homewood, Ill. 60430

[22] Filed: Jan. 26, 1970

[21] Appl. No.: 5,808

[52] U.S. Cl. ............................ 100/211, 100/233, 220/31 S
[51] Int. Cl. ................................................. A47j 19/02
[58] Field of Search ................... 100/133, 211, 233, 234; 146/3 C, 3 J; 220/31 S; 206/.5; 222/1 NQ

[56] References Cited

UNITED STATES PATENTS

| | | | |
|---|---|---|---|
| 986,800 | 3/1911 | Carroll | 100/211 |
| 1,950,465 | 3/1934 | Whitlock | 220/31 S |
| 2,454,905 | 11/1948 | Allen | 100/233 UX |
| 2,707,912 | 5/1955 | Squarcio | 100/233 X |
| 2,842,178 | 7/1958 | Solomon | 220/31 S UX |
| 3,126,821 | 3/1964 | Schlidt | 100/133 |
| 3,207,610 | 9/1965 | Belkin | 100/211 X |
| 3,410,391 | 11/1968 | Kanter | 220/31 S X |

FOREIGN PATENTS OR APPLICATIONS

| | | | |
|---|---|---|---|
| 618,827 | 2/1949 | Great Britain | 220/31 S |
| 348,697 | 5/1937 | Italy | 146/3 E |
| 475,748 | 9/1969 | Switzerland | 100/233 |

*Primary Examiner*—Daniel Blum
*Attorney*—McDougall, Hersh & Scott

[57] ABSTRACT

A device for storing and dispensing fruit segments and for extracting juices therefrom by squeezing comprising two disk members dimensioned to have a common edge whereby each of the disk members is movable relative to the other about the common edge, a wall member fixed to one of the disk members opposite the common edge to form a closed wedge-shaped container, and means for releasably latching the disk members to secure a fruit segment there between.

3 Claims, 5 Drawing Figures

PATENTED JAN25 1972 3,636,870

INVENTOR
Samuel M. Arthur
by McDougall, Hersh, and Scott Attys

DEVICE FOR EXTRACTING FRUIT JUICES

The present invention relates to a device for storing and dispensing fruit segments and for extracting juices therefrom.

Various devices for squeezing fruit slices, and particularly citrus fruits, are known to the art. In the most common example, such devices comprises two semicircular disk members jointed at a common edge to provide a wedge-shaped device which is adapted to receive a segment or slice of fruit for the purpose of extracting the juices therefrom by squeezing.

The devices of the prior art have generally been limited to reusable devices which can only be used for extracting the juices from the fruit segment contained therein, and have not been adaptable for use in the storage or dispensing of the contents.

It is accordingly an object of the present invention to provide a device for storing and dispensing segments of fruits, and for extracting juices therefrom, which overcomes the foregoing deficiencies of the prior art.

It is another object of the present invention to provide a device for extracting juices from fruits or the like which may be used in the storage and dispensing of the fruit segment contained therein.

It is a further object of the present invention to provide a device for extracting juices from fruits which is adaptable to be used in a sanitary manner whereby contact between the user and the juices extracted from the fruit segment is completely avoided.

It is a further object of the invention to provide a device for extracting juices from fruits which may be disposed of after use.

These and other objects and advantages will appear hereinafter, and for purposes of illustration, and not of limitation, an embodiment of the invention is shown in the accompanying drawing in which.

The concept of the present invention resides in a device for storing and dispensing segments of fruit and the like, which can also be used for extracting juice therefrom, which comprises two disk members dimensioned to have a common edge about which the disk members are movable relative to each other, an arcuate panel or wall member fixed to one of the disc members opposite the edge to provide a closed wedge-shaped container adapted to receive a fruit segment, and means of releasably latching the members to thereby secure the fruit segment therebetween.

The device of the present invention can be used for storing and dispensing fruit segments prior to use as well as for squeezing the segments to extract juices therefrom. At least one of the disk members defines outlet means to permit the flow of the juice from the device in a controlled manner. In this way, the flow of juices from the device can be accurately controlled in a sanitary manner whereby contact between the hands of the user and the juice is completely avoided.

Figure 1:
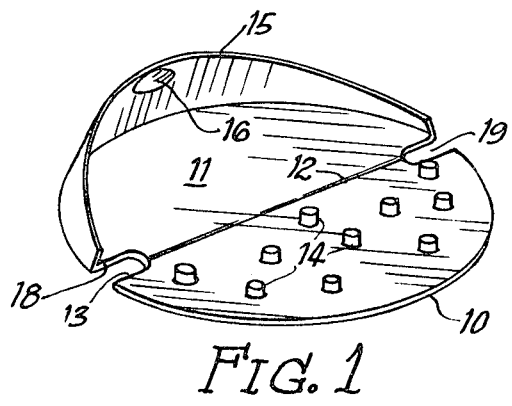
FIG. 1 is a view of a device according to the invention shown in its open position.

Referring specifically to FIG. 1 there is shown an embodiment of the present invention comprising two semicircular disk members 10 and 11 which are adapted to be folded and which are movable relative to each other at a common edge 12. In the embodiment illustrated in this figure, discs 10 and 11 are integral and are designed to share the common edge 12, along which disk members 10 and 11 may be folded so as to be movable relative to each other. It will be appreciated that 10 and 11 can also be separate and distinct and may consequently be hinged along a linear edge.

As shown in this figure, disk members 10 and 11 are each provided with one groove 13 and 18, respectively, which together define an outlet opening 19 along the edge 12 through which the extracted juices may flow in a controlled manner whereby contact between the juices and the hands of the user is completely avoided. However, it will be understood that various outlet means may be employed in place of those described in FIG. 1. For example, it is possible to provide outlet means in the form of an opening in one of the disk members whereby extracted juices may flow therethrough in a controlled manner.

In accordance with the preferred embodiment of this invention, either disk member 10 or 11 is provided on its inner surface with a plurality of nubs or cylindrical projections 14 which are adapted to engage a fruit segment contained in the device to exert an additional pressure thereon for more efficient extraction of the fruit juices. As shown in this figure, the projections 14 are provided on disk member 10, although it will be understood that the projections 14 may be provided on disk member 11, or both disk members 10 and 11.

At least one of the disk members, shown as member 11 in FIG. 1, is provided with an arcuate sidewall 15 opposite edge 12 which serves to close the device when disk members 10 and 11 are folded to form a wedge-shaped container.

The device is also provided with means 16 for releasably latching disk elements 10 and 11 to thereby secure a fruit segment therebetween. In the embodiment illustrated in the drawing, means 16 comprises a lip member projected into the interior of the device to thereby releasably engage the edge of disk member 10. It will be appreciated that a variety of other latching means may be provided, either on sidewall 15 or disk element 10. For example, it is possible ro provide a fingerlike projection on the edge of disk element 10, which is adapted to be releasably engaged with an opening in sidewall 15. Various other types of latching means will be apparent to those skilled in the art.

Figure 2:
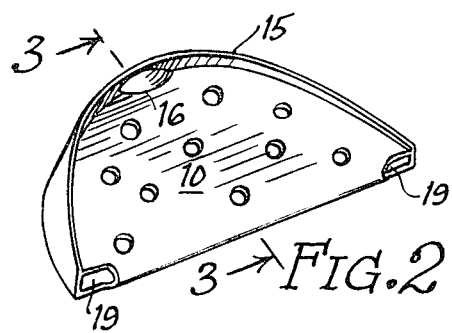
FIG. 2 is a view of the device shown in FIG. 1 in the closed position.
Figure 3:
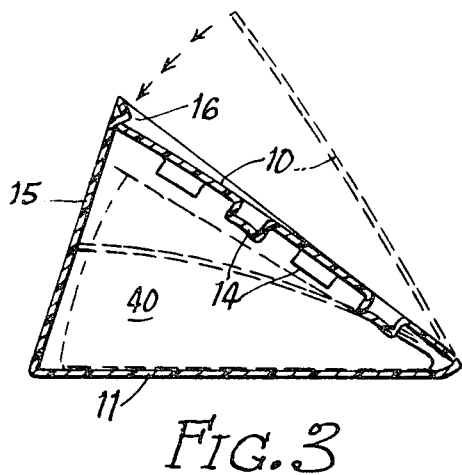
FIG. 3 is a sectional view of the device shown in FIG. 2 taken along the lines 3—3.

The device of the present invention is shown in its closed position in FIGS. 2 and 3. It will be seen that disk members 10 and 11 are secured by lip member 16, against which disk member 10 is latched to provide a container for a fruit segment 40.

Figure 4:
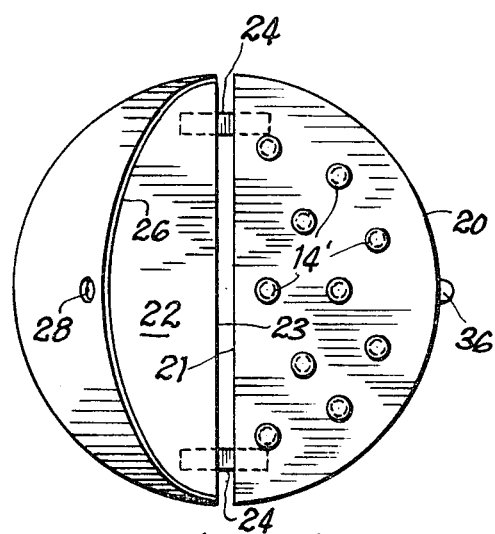
FIG. 4 is a view of an alternative embodiment shown in its open position.
Figure 5:
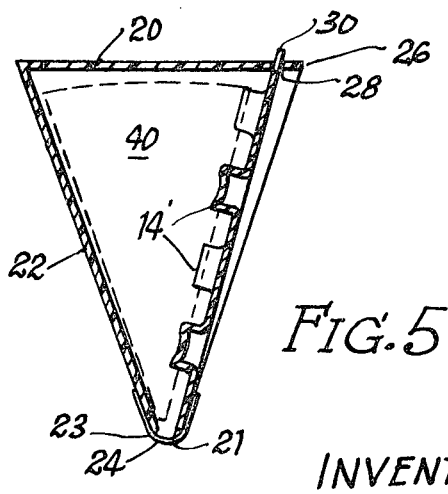
FIG. 5 is a view of the embodiment of FIG. 4 shown in its closed position.

An alternative embodiment of the invention is shown in FIGS. 4 and 5. It will be seen in FIG. 4 that disk members 20 and 22 are hinged along their parallel linear edges 21 and 23, respectively, so as to be movable relative to each other by means of one or more hinge members 24, which are preferably a flexible element joining disk members 20 and 22 formed of plastic or other similar flexible materials. However, it will be appreciated by those skilled in the art that a variety of other conventional hinge members may be employed. Thus, in this embodiment, the juice may be allowed to flow from the device in a controlled manner through the opening defined by edges 21 and 23 of disk members 20 and 22, respectively.

In this embodiment, the sidewall 26 fixed to one of the disk members 22 is provided with an opening 28 near the edge 25 opposite disk member 22 with an aperture 28 which is adapted to receive a fingerlike projection 30 integral which operates to secure disk members 20 and 22 together as shown in FIG. 4 to provide a closed container. Projection 30 is preferably formed of a flexible material, such as thin metal or plastic, to facilitate the engagement of projection 30 in aperture 28 to secure the disk members in the form of a closed container for a fruit segment 40.

The disk members and sidewall of the device of the present invention may be formed of sheet metal, but are preferably formed of thin plastic material to provide a disposable container and squeezer device. Such plastic materials are quite inexpensive, and hence containers formed thereof can be economically disposed of after a single use.

The container device of the present invention is susceptible to a variety of uses, but finds particular applicability for use in conjunction with prepackaged lemon segments for subsequent storage, distribution, and use. For example, lemon segments can be cut and placed between the disk members, which are then closed and secured by engaging the latching means to provide a housing for the lemon segment. The lemon segment can then be stored and distributed in the form of a prepackaged lemon segment. In use, the juice from the prepackaged lemon segment is extracted by displacement of the disk members toward each other whereby the lemon segment contained in the housing is subjected to a squeezing action in response to the displacement of the disk members. The extracted juices flow through the openings in the disk members whereby contact between the juices and the hands of the user can be completely avoided.

It will be apparent that I have provided a new and improved device for storing and dispensing segments of citrus fruits and the like which can also be used to extract juices from the fruits in a sanitary manner whereby the user can completely avoid contact with the juices extracted from the fruit segment. The device of the present invention also facilitates sanitation in packaging and storing in that it is possible to automatically package segments of citrus fruits in a device embodying the concepts of the present invention whereby no human contact with the fruit segment is necessary from the time the fruit is packaged until it is used.

The device of the present invention finds particular application for use on commercial aircraft and the like, where time does not permit extensive preparation and handling of fruit segments, such as lemon segments, for use with beverages or foods. Thus, the fruit segments can be precut and packaged in the device of the present invention whereby it is necessary for a stewardess or the like to place the packaged fruit segment with the item being served, without the need to prepare the fruit segments or to insert each fruit segment into a squeezing device, since the device of the present invention can be used for the storage and dispensing of fruit segments, as well as for extracting juices therefrom.

It will be understood that various modifications may be made in details of construction or use without departing from the spirit of the invention, especially as defined in the following claims.

I claim:

1. A device for storing and dispensing fruit segments and for extracting juices therefrom by squeezing comprising two semicircular disk members, said disk members sharing a common edge whereby said disk members are movable relative to each other and at least one of said disk members being provided with projections thereon, a sidewall attached to one of said members opposite said edge to define a wedge-shaped container for housing a segment therein, said segment being squeezed in response to displacement of said disk members toward each other whereby said projections engage the segment to squeeze juice therefrom, and a lip member formed on said sidewall, said lip member being attached to releasably engage the edge of the other of said disk members to secure a fruit segment between said disk members and juice outlet means defined by at least one of said disk members.

2. A device as defined in claim 1 wherein said disk members are integral with each other and are adapted to be folded along said edge.

3. A device as defined in claim 1 wherein said disk members and said sidewall are formed of a thin plastic.

* * * * *